INVENTOR.
KENNETH R. SEICHTER
THOMAS P. DONAHER
BY Raymond L. Owens ATTY

July 15, 1969 K. R. SEICHTER ET AL 3,456,244

DATA TERMINAL WITH PRIORITY ALLOCATION FOR INPUT-OUTPUT DEVICES

Filed March 1, 1967 3 Sheets-Sheet 2

INVENTORS
KENNETH R. SEICHTER
THOMAS P. DONAHER
BY Raymond L. Owens
ATTY

INVENTOR.
KENNETH R. SEICHTER
THOMAS P. DONAHER
BY Raymond L. Owens
ATTY 3,456,244
Patented July 15, 1969

3,456,244

DATA TERMINAL WITH PRIORITY ALLOCATION FOR INPUT-OUTPUT DEVICES

Kenneth R. Seichter and Thomas P. Donaher, Rochester, N.Y., assignors to General Dynamics Corporation, a corporation of Delaware Filed Mar. 1, 1967, Ser. No. 619,850
Int. Cl. G11b *13/00*
U.S. Cl. 340—172.5 10 Claims

ABSTRACT OF THE DISCLOSURE

A data terminal for interchanging data between a number of data handling or processing devices is disclosed. The terminal includes a memory unit which retains data from a line or from the devices. A plurality of data handling sections surround the memory. Each section is in communication with one of the data handling devices. Only one data handling section at any given time may interchange data with the memory unit. The data terminal includes a priority circuit which is preprogrammed with an assigned priority level for each of the various data handling sections and which permits access to the memory of the requesting section which has the highest assigned priority.

The present invention relates to data terminals which provide a communication link between data handling devices.

Information represented by electrical signals is often transferred between data handling devices which inherently operate at different speeds. For example data may be transferred between such data handling devices as a card reader and a computer. Some form of buffering means must be provided between these two units if there is to be any effective interchange of data. When there are a number of data handling devices involved, which at varying times are to be connected to each other, a data terminal is normally employed to provide not only the buffering function but also acting as a traffic routing means for directing the data flow between the devices.

A data terminal in accordance with the invention includes a central memory unit and at least four surrounding data handling sections, with each section being associated with a data handling device. The data terminal also includes a priority apparatus which operates in conjunction with the various sections of the data terminal to provide access to the memory unit from only the requesting data section which has the highest assigned priority level, while excluding access to those having a lower assigned level of priority. The assigned priority levels are preprogrammed into the priority apparatus. By means of this arrangement, a data terminal in accordance with the invention will permit an efficient and economical means for providing a communication link between the data handling devices.

Figure 2B:
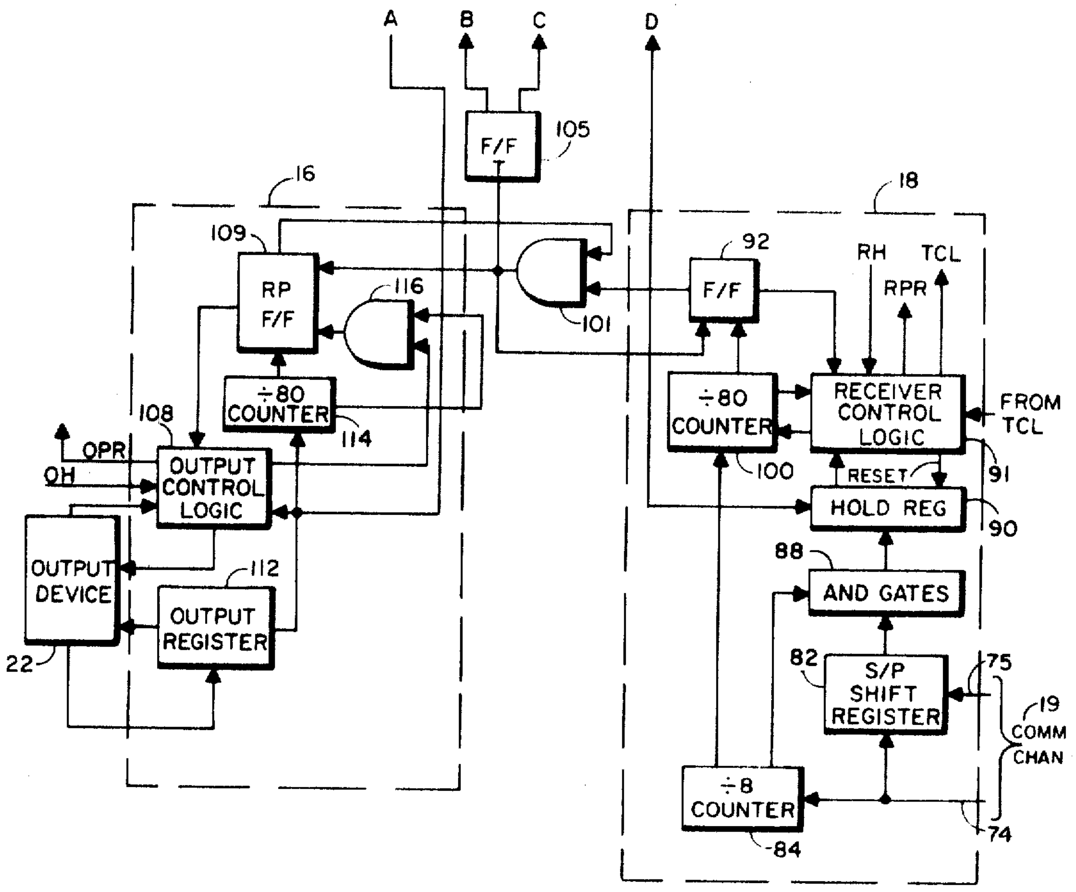
Figure 2C:
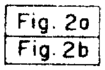
Figure 1:
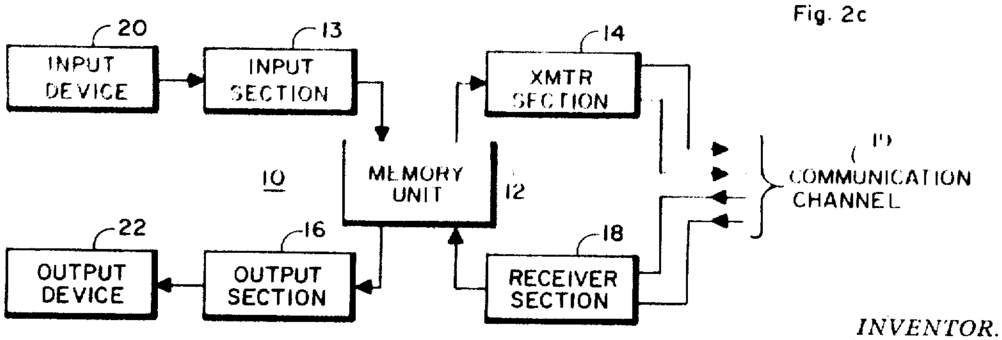
Figure 2A:
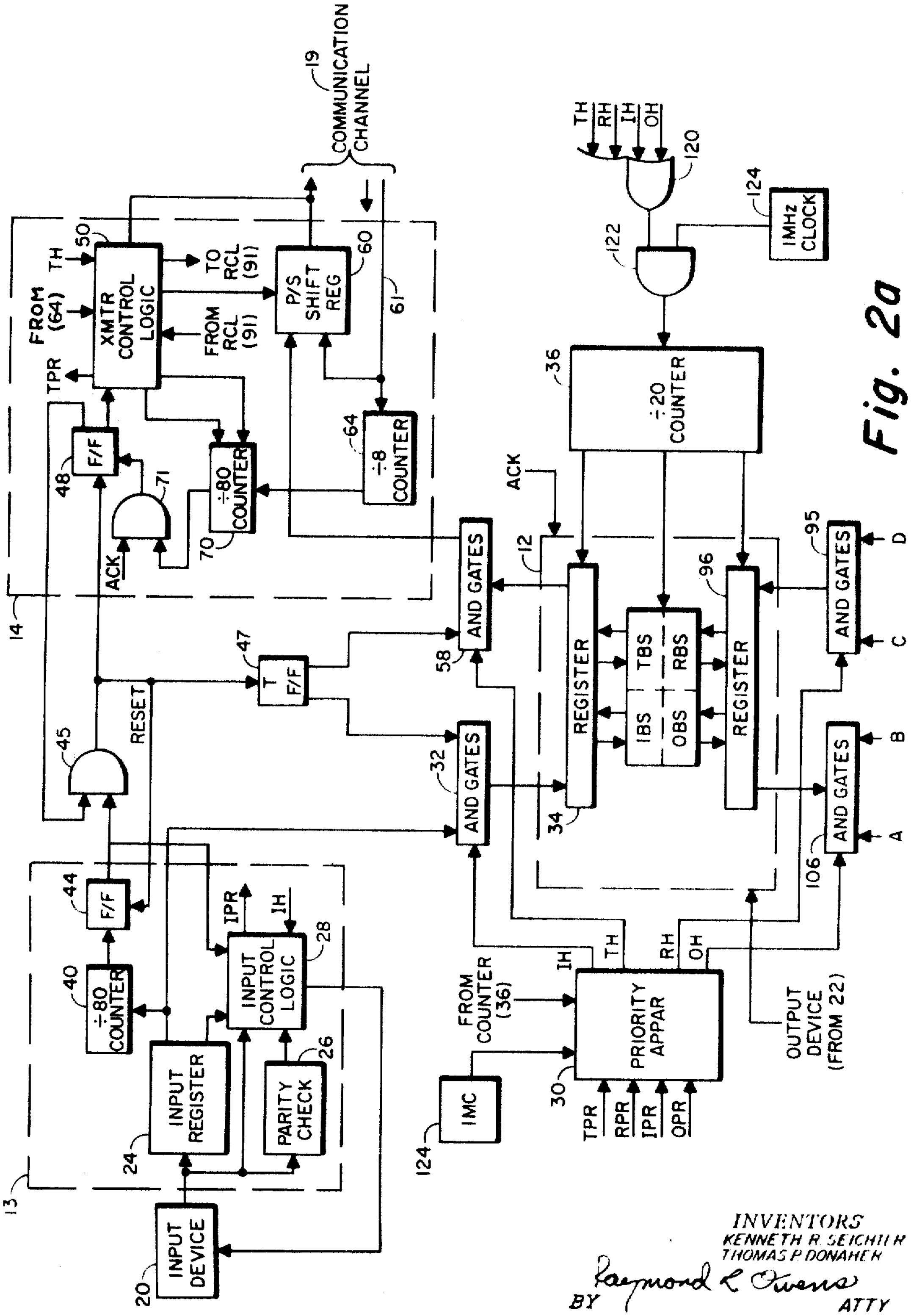
Figure 3:
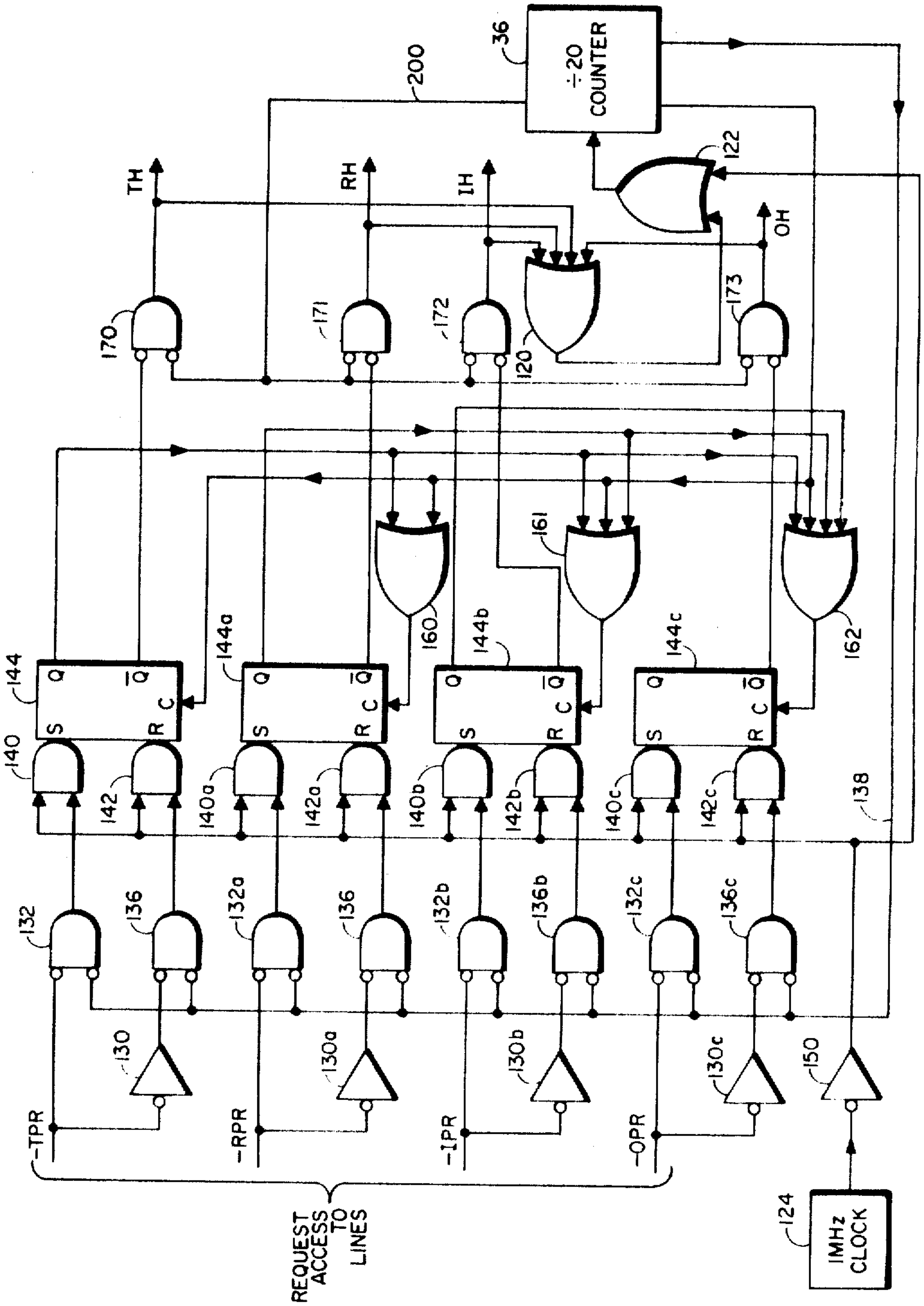

The invention itself, both as to its organization and method of operation, as well as objects and advantages thereof will become more readily apparent from a reading of the following description taken in connection with the accompanying drawings in which:

FIGURE 1 is a block diagram showing the general arrangement of a data terminal in accordance with the invention;

FIGURES 2*a* and 2*b*, when aligned, as shown in FIGURE 2*c*, form a block diagram showing the major components of the blocks of the data terminal of FIGURE 1; and FIGURE 3 is a block diagram of the priority apparatus shown in FIGURE 2*a*.

Referring first to FIGURE 1, there is shown the general organization of a data terminal 10 in accordance with the invention which includes a central memory unit 12, servicing four surrounding data handling sections, namely an input section 13, a transmitter section 14, an output section 16, and a receiver section 18.

The data terminal 10 performs two main functions, sending and receiving. In the sending function, data are transmitted from a data handling input device 20 into the input section 13 and from the input section 13 into a data storage section of the memory unit 12. From the memory unit 12 these data are then transmitted into the transmitter section 14, which in turn delivers them to a communication channel 19 linked to another data handling device, for example, a computer. Although it will be described in more detail hereinafter, it may be helpful to note at this point that a group of data bits, representing a character, is transported in a parallel manner from the input to the transmitter section. The transmitter section 14, however, is adapted to convert each character into a serial stream of bits for a more convenient transmission onto the communication channel 19.

In the data receiving function a stream of data bits is delivered in a bit-by-bit serial fashion from the communication channel 19 to the receiver section 18. The receiver section 18 then assembles this serial stream of bits into discrete characters, in parallel form, and each character thereafter is processed through the data terminal 10.

The data terminal 10 is organized so as to handle messages of a fixed block length with each character also being of fixed number of data bits, which length will depend upon the information code being used.

Therefore, if the so-called ASCII code is used a character will be represented by seven data bits, but an eighth bit may also be provided to permit a parity error check. The term "character" will be understood to be indicative of either textual information i.e. representative of a letter in the alphabet or a framing control character, i.e. one that indicates the beginning or end of a message block. Actually, a message block may be thought of as being comprised of five different types of characters: an initial start of message (header) character SOH, a second character representing the type of device which originated the message (SEL), the textual message characters, an end of message (text) character (ETX), and a final character in a message block, the block parity check character.

In the sending function, an entire message block from the input section 13 will have to be loaded into a particular message storage location of the memory unit 12, before the transmitter section 14 is permitted to transmit on the communication channel 19. Similarly, before the output section 16 is permitted to transmit characters, the receiver must have loaded an entire message block into a particular storage portion of the memory unit 12.

For more efficient operation of the data terminal 10, it has been found that there should be at least two separate message storage locations adapted to accept an entire message block from the input section 13 and two separate message storage locations associated with the receiver section 18. The reason for providing these various locations will become clearer later.

The data sending function will be described first, and reference should now be made to the input section 13 shown in FIGURE 2*a*. When the input device 20, for example a card reader, although others may be alternatively switched in, is ready to transmit data, it initially injects its first character of a message into an input register 24 in the input section 13. At the same time, this character is sampled by parity checking circuitry 26 and input logic control circuitry 28. If the parity check on the character is affirmative, the input control logic 28 will produce an input priority request (IPR) which is applied to a priority apparatus 30, shown adjacent to the memory unit 12. (The interconnections among the lettered lines are not shown on the drawing, in the interest of clarity.)

Assuming that the priority apparatus 30 now honors this request, it will enable an input honored line (IH) which is applied to the following logic elements: the input control logic 28, a block of AND gates 32, shown just above a holding register 34 in the memory unit 12, and to a counter 36 by way of logic circuitry to be described later. The enabled AND gate 32 transfers the character from the register 24 into the holding register 34. Thereafter, the logic circuitry will disable the IPR signal, and signal the input device 20 to feed the next character into the register 24, when it is ready to do so. The sequencing of the data transfer between the message register 34 and a first message storage location of the memory unit 12, hereinafter called input buffer storage (IBS), is under the control of the counter 36, and control lines from the counter go to the memory unit. Since the counter 36 runs only after the priority apparatus 30 honors a priority request, proper timing of the transfer of characters between the memory and the various sections 13, 14, 16 and 18 will occur.

Each time data are transmitted from the input register 24 into the register 34, a counter 40 receives a single input signal from the register 24. When the counter 40 accumulates a count totaling 80, indicating that an entire message block has been loaded into the memory unit 12, it will reset itself to zero and provide an output, actuating a flip-flop 44 which now signals that the IBS is full by providing an inhibit signal to the logic 28 preventing it from developing its IPR signal. The flip-flop 44 also applies a signal to an AND gate 45, shown midway between the input and transmitter sections, which will also receive an enabling level from a flip-flop 48, disposed in the transmitter section 14. The output from the AND gate 45 resets the flip-flop 44, disabling the inhibit line to the logic 28, and provides a triggering pulse to a flip-flop 47.

As a result of being triggered, the flip-flop 47 will disable certain AND gates in the block 32 which are adapted to couple the input section 12 to the IBS, while enabling a second set of AND gates in the block 32 which couple the input section to a second message storage location called the transmitter buffer storage (TBS). In a similar fashion, the flip-flop 47 will at this time couple certain of the AND gates 58 to the IBS location. If the transmitter section 14 is enabled as will be described hereinafter, the message in the IBS location will be first read out. When the flip-flop 47 is triggered for the second time, a certain set of the second AND gates 58 will be enabled and the second stored message in the TBS will then be read out.

It should be remembered that the AND gates 32 will only be able to transmit data when the IH signal has been developed by the priority apparatus 30, and similarly the AND gates 58 will only be able to transmit signals when the transmitter honor signal (TH) signal is on.

Turning now to the transmitter section 14, when the flip-flop 48 has been signaled by the AND gate 45, it will provide an input to a transmitter control logic 50, signaling that a message has been loaded into the IBS. In response to this signal, the transmitter-control logic 50 now produces a transmitter priority request signal (TPR), in much the same manner as the IPR was developed. Assuming now that the priority apparatus honors this request, it will develop a transmitter honor signal (TH) which is delivered to the following logic elements: the AND gates 58, the logic circuitry associated with the counter 36, and the transmitter control logic 50 which in response thereto disables its TPR signal. Thereafter, during the counting cycle of the counter 36, a character representative of data will be transferred by way of AND gates 58 into a parallel-to-serial shift register 60.

The general arrangement employed by the transmitter section 14 for transferring characters onto the communication channel 19 will now be set forth. As shown, there is a transmitter clock line 61 which receives clock pulses from the unit with which transmitter section 14 is in communication. These clock pulses are continuously applied to the shift register 60, and are adapted to cause information stored in the register 60 to be read out to the communication channel 19.

When the transmitter section is idling, (viz not sending out a message) the logic control circuitry will feed a predetermined character into the shift register after a series of eight clock pulses from the communication channel 19 are detected by a divide by eight counter 64. This character will be referred to as a sync idling character and provides the means for synchronizing a receiver divide by eight counter 84 to be described in conjunction with the receiver section 18 to the transmitter divide by an eight counter 64.

The divide-by-eight counter 64 in response to the clock pulses feeds a signal upon a count of eight to the transmitter-control logic 50 and to a divide-by-eighty counter 70. The divide-by-eighty counter 70 will only be able to receive these signals when the transmitter control logic has received a TH signal and will be so signaled by the logic 50.

Returning now to the point in operation where a character was first loaded into the shift register 60, the clock pulses on the communication line 19 will now sequentially read out the first character comprised of eight data bits, and when the eighth clock pulse is recognized by the counter 64, it will provide an input signal to the counter 70. The transmitter section 14, in order to receive the next character, must go through the same process of requesting a TPR and of having this signal honored by the priority apparatus 30. In a similar fashion, the transmitter section 14 will continue operation until the counter 70 accumulates a count totaling eighty which, of course, means that an entire message block has been sent out on the communication channel 19. The counter 70 now provides an input to an AND gate 71 the role of which is to reset the flip-flop 48.

A second input to the AND gate 71 is applied by a line designated ACK (Acknowledgement) which when on, indicates that the unit on the other end of the communication channel has correctly received the message block. If the ACK signal is present, and AND gate 17 would provide a resetting pulse to the flip-flop 48, which in turn enables its output lead line to the AND 45. If the ACK signal were not received, the transmitter control logic previously having been signaled by the counter 70 and transmit control logic 50 that an entire block has been transmitted, would inject a new character into the register 60, which when shifted out onto the communication channel, would inquire as to whether a message has been received. The receiver section 18 will now process the answer to this question and direct it to the transmitter control logic. If the answer to this question were in the negative, the transmitter control logic 14 would cause the same message block from the IBS to be read out a second time and transmitted over the communication channel 19. If the ACK were received, however, the message stored in the IBS would then be erased and, as previously described, the next message read out by the transmitter section 14 would be that stored in the TBS.

As shown in FIGURE 2*b*, a receiver clock pulse line 74 continuously sends clock pulses which strobes information on a line 75 (both lines 74 and 75 coming from the data handling device to which the receiver is coupled) into a shift register 82. When no data are transmitted, the receiver clock will strobe the bits of a sync idle character from the line 75 into the series-parallel shift register 82. Upon receiving eight clock pulses, the divide-by-eight counter 84 will enable AND gates 88 which inject the character stored in the register 82 into a holding register 90. The character in holding register 90 is now decoded by receiver control logic. If a sync idle character is decoded the register 90 will merely be reset. However, if a textual character is present and if a flip-flop 92 indicates that there is a storage location available in the memory unit 12 for a new message block, the receiver control logic 91 will develop a receiver priority request (RPR).

If the RPR is honored, receiver honored (RH) signal will be returned from the priority apparatus 30 to the receiver control logic circuitry 91. The RH signal is also injected into AND gate 95 (see FIGURE 2*a*) which permits the transfer of information through appropriate one of the AND gates 95 into a register 96 associated with a message block storage location referred to as a receive buffer storage (RBS) and a second message block storage location referred to as output buffer storage (OBS).

The receiver section 18 contains a number of elements which correspond to those previously described in the transmit section 14. For example, in the receiver section 18 there is provided a divide-by-eighty counter 100 which receives its input from the divide-by-eight counter 84 and a second enabling input from the receiver control logic 91, which indicates that an RH signal has been provided. When the counter 100 accumulates a count corresponding to eighty, it will signal the flip-flop 92 that an entire message block has been loaded into the RBS location of the memory and will signal the receiver control logic 91, commanding it to inhibit any further RPR requests. At the same time, the flip-flop 92 provides an enabling pulse to an AND gate 101, which receives the second signal from a flip-flop 109 disposed in the output section 16. In response to these two inputs, the AND gate 101 generates an output signal which resets the flip-flop 92. This action now permits the receiver control logic 91 to develop the next RPR request. The AND gate 101 also signals a flip-flop 105 wich provides inputs to the AND gates 95 and also to AND gates 106 associated with the output section 16 so that readout from the memory unit will first be taken from the RBS location, while the second message will be loaded into the OBS location. When signaled or triggered a second time, the flip-flop 105 actuates certain AND gates 95 and 106 to cause data to be read out of the OBS location. The flip-flop 105 therefore corresponds in function with the flip-flop 47 (FIGURE 2*a*).

The operation of the output section 16 will now be described. At the outset, however, it will also be noticed that many of its elements also correspond structurally and functionally to counterpart elements found in the input section 13.

When the flip-flop 109 is signaled by the AND gate 101, indicating that a message block has been loaded into the RBS location the flip-flop 109 will in turn disable its output to the AND gate 101 and apply a second output to the output control logic 108, which now allows the output device 22 to develop a signal indicating a request for access to the memory unit (OPR). If this request should be honored, the priority apparatus 30 will develop an output honored signal OH, and AND gates 106 will be enabled. The counter 36 will also be signaled and commence operation, and a character will be transferred into an output holding register 112.

Thereafter, the output register 112 signals the output device 22 that it is holding a character and the device 22, will in response, enable the register 112 to transfer data to the output device 22. Each time that a character is injected into the output register 112, a divide-by-eighty counter 114 is signaled. When eighty characters have been transferred to the output device, the counter 114 will provide an output signal to an AND gate 116, with the second input coming from output device 22. When the flip-flop 109 is reset by the AND gate 116, it will again provide an input to the AND gate 101. If at this time the second message block were already loaded, the gate 101 would again signal the flip-flop 109 and the above process would be repeated.

On the other hand, if the device 22 desires to have the message block repeated, the device 22 will signal the output control logic 108. The output line to the AND gate 116 from the counter 114 will be disabled and the first message block retransmitted.

The memory unit 12 has not been described in detail, inasmuch as a number of commercially available units can readily be adapted to provide its function. The memory will, of course, include the necessary memory storage sections, address register, read and restore circuits, and holding registers.

Turning now to FIG. 3 where the priority apparatus 30 is shown, standard logic circuits have been shown by well-known symbols in order to facilitate understanding. At the input to the priority apparatus are the four request lines, one from each of the respective data handling sections. The priority apparatus 30 has been preprogrammed so that the following descending order of priority has been assigned to each of these sections: transmitter, receiver, input and output. For a specific example, if the receiver section 12, by means of its RPR signal, requests access to the memory unit 12, the priority apparatus 30 would provide the RH output, while refusing to honor the OPR request from the output section 16. On the other hand, if at this time the transmitter section 14 had requested access to the memory unit, the receiver access request RPR would have been denied by the priority apparatus and the TH signal developed.

The response of the priority apparatus 30 in honoring a TPR request for access of the transmitter section 14 will be set forth in detail as it illustrates the operation of the apparatus 30. If a request for access line TPR is at low voltage level, when compared against some reference level, for example, +4.0 volts, it will indicate that its section 14 is requesting access to the memory unit 12, whereas if the voltage on its line is high (viz at +4.0 volts), this will indicate that the section does not request access.

This TPR signal is applied to two types of logic circuits, an inverter 130, shown by means of a triangle having a circle connected at its base which will invert the level of an input signal and a negative AND gate 132. Thus if the input to an inverter 130 is low, its output will be high. Each of the negative AND gates in the apparatus 30 is shown as a D-shaped block having circles coupling its input lines to the straight line portion of the D. Each negative AND gate develops a high output voltage level when both input voltages are low. Of course, should one of these inputs revert to a high level, or if both are at a high level, the output of the negative AND gate will be low.

Returning to the low TPR receiver line, it will provide an input to the inverter 130 which in turn will produce a high level output applied as an input to a negative AND gate 136. At this time the TPR input to the negative AND gate 132 is, of course, low. A second input to both the gate 132 and 136 is provided by a strobing line 138, actuated by the counter 36 in the late stages of counting, say, when it reaches its eighteenth count, and when it reaches its rest state (count zero). Only at these times will the strobe line 138 turn low and the output of gate 132 will go high for the strobing pulse. Whereas the output of the gate 136, coupled to the inverter 130, will remain low.

It should be noted that both of the negative AND gates, 132 and 136 respectively, feed AND gates 140 and 142. The AND gate 140 is disposed at the set input of a flip-flop 144, whereas the AND gate 142 is located at the reset input of the flip-flop 144. A second input to each of the gates 140 and 142 is provided by an inverter which responds to the clock pulse generator 124. Ordinarily, the output of each of the AND gates 140 and 142 is low. In order for AND gates to provide an actuating pulse to the flip-flop 144, its output must dip from low to high and then return to a low level, such being the nature of this flip-flop (e.g. a type SU 320 manufactured by Signetics, Inc. of Sunnyvale, Calif.).

Only when the trailing negative (low) portion of the wave developed by the generator 124 is injected into the inverter gate 150, will the output of the AND gate 140 dip low. When the counter 36 reaches a count of nineteen, the strobe line 138 will return to a low level and as a consequence, the output of the AND gate 140 will return high, causing the set input of the flip-flop 144 to turn high and the reset side low. In a similar fashion, it should now be clear that if the TPR was high, the reset side of the flip-flop 144 would have been actuated by the AND gate 142. There are counterpart logic circuits for the remaining priority request lines responsive to those just described for the TPR line, namely, inverters 130 (*a* to *c*), negative AND gates 132 (*a* to *c*) and 136 (*a* to *c*), AND gates 140 (*a* to *c*), 142 (*a* to *c*) and finally flip-flops 144 (*a* to *c*).

The set side (Q) output line of the flip-flop 144 is applied to each of three OR gates 160, 161, and 162, each of which provides a resetting pulse to the DC, labeled "C," reset input of the flip-flops 144 *a*, *b*, and *c*. Any time one of the flip-flops of higher priority has been set, it will provide an actuating signal by way of the OR gate associated with the flip-flops having a lower priority level and, of course, will reset these flip-flops. The result of this process is that the enabled flip-flop will be the one associated with the requesting priority request line having the highest priority. For example, if the flip-flop 144*b* is set, it will reset the flip-flop 144*c*, which has a lower priority order.

Negative AND gates 170 to 173 are coupled to the output of the reset side $(\overline{Q})$ of the flip-flops 140, 140*a*, 140*b* and 140*c*, respectively and provide the requisite output honored request signal when enabled. The gates 170 to 173 are enabled when the counter 36 reaches a count of twenty via output line 200. When the counter recycles to zero the reset (C) inputs of the flip-flops 144 and 144 (*a* to *c*) receive reset pulse directly or via their respective OR gates 160, 161, 162. An OR gate (not shown) in the (C) input of the flip-flop 144 may be provided for delay equalization purposes. The counter 36 cycle starts with and occurs during a priority input (viz TH, RH, IH or OH) during which the AND gate 122 (see also FIGS. 2*a* and 2*b*) is enabled to pass clock pulses by the priority input levels which are applied thereto via the OR gate 120. Because of this timing sequence, any spurious signal developed by the priority apparatus in producing an honored signal will not initiate any transfer of data between the memory unit 12 and a section whose request for access has not been honored.

Reviewing the operation of the priority apparatus, it is provided with a plurality of flip-flops 144 and 144 (*a* to *c*), each associated with the request for access line of a data handling section and each having been assigned an order of priority, so that only the flip-flop corresponding to the requesting line having the highest assigned priority will be able to produce the honored request signal which in conjunction with outputs developed by the counting means 36 will transfer data between the honored section and the memory unit 12.

From the foregoing description it will be apparent that there has been provided an improved data terminal having a memory unit and a plurality of data handling sections surrounding the memory. Variations and modifications of the herein described data terminal and components therefor will undoubtedly become apparent to those skilled in the art. Accordingly, the foregoing description should be taken as illustrative and not in any limiting sense.

What is claimed is:

1. A data terminal comprising (a) a memory unit for storing message blocks, with each message block being comprised of a fixed maximum number of characters and each character being formed by a fixed number of data bits, (b) a plurality of data handling sections, each of said sections including means for requesting access to said memory unit and means responsive to an honored request signal for coupling said section to said memory unit, (c) data transferring means comprising (i) a priority apparatus responsive to the request for access signals of each said sections for developing said honored request signal for only one of said requesting sections, (ii) counting means responsive to said developed honored signal for transferring a character between said memory unit and said honored section, (d) said priority apparatus comprising (i) a plurality of flip-flops, each associated with a data handling section, (ii) means responsive to said counting means for injecting said request for access signals developed by said requesting sections into their associated flip-flop, thereby actuating each flip-flop to indicate whether or not its section had requested access to said memory unit, and (iii) means preprogramming said priority apparatus assigning each said section a given level of priority for disabling all of the actuated flip-flops with the exception of the one having the highest assigned level of priority which develops said honored signal.

2. The invention as set forth in claim 1, wherein said priority assigning means includes a plurality of OR gates for receiving signals from an enabled flip-flop of higher priority and adapted to disable all of the actuated flip-flops of a lower order of priority.

3. The invention as set forth in claim 2, wherein said counting means is enabled by an honored request signal and a signal developed by a generator operating at a predetermined frequency.

4. The invention as set forth in claim 1, wherein said data handling section include (a) a data receiver section including (i) means for transferring on a character-to-character basis characters of a message into a preassigned location in said memory unit, and (ii) counting means for determining when a message block has been loaded into said memory means, (b) an output section including (i) means responsive to said count determining means of said receiver section for signaling said request for access means to request access to said priority apparatus, (ii) a register for accepting a character, and (iii) means responsive to said honored request signal from said priority apparatus for inserting a character into said register, (iv) means for transferring said character in said register to said output device, and (v) means for determining when an entire message block has been transferred to said output device for signaling said receiver section to transfer another block to said memory unit.

5. The invention as set forth in claim 1, wherein said data handling sections include (a) a data input section including (i) means for transferring on a character-to-character basis, characters of a message into a first preassigned location in said memory unit, and (ii) counting means for determining when a complete message block has been loaded into said first location of said memory means by developing a message loaded signal, (b) a transmitter section coupled to a communication channel including
   (i) means responsive to said message loaded signal for signaling said transmitter section request for access means to request access to said priority apparatus,
   (ii) a shift register for accepting a character,
   (iii) means responsive to said honored request signal from said priority apparatus for inserting a character into said shift register,
   (iv) means for transferring in bit-by-bit serial fashion said character from said shift register said communication channel, and
   (v) means for determining when an entire block has been transferred to said communication channel for signaling said input section to start to transfer the next block into said memory unit.

6. A data terminal for switching input and output devices into transmitting and receiving relationship with a communication channel, said terminal comprising
(a) input and output sections associated respectively with said input and output devices, and transmitting and receiving sections associated respectively with said channel,
(b) a memory having storage for data messages received from said channels and destined for said output device and also storage for messages originated in said input device.
(c) a plurality of control logic means each associated separately with a different one of said sections,
(d) memory control means for transferring data selectively between different ones of said devices and said channels through said memory and said sections in accordance with commands,
(e) means included in each of said control logic means for generating said commands, and
(f) priority control means for applying said commands to said memory control means only in accordance with a predetermined priority allocation.

7. The invention as set forth in claim 6, wherein said control logic means includes means for providing temporary storage for data transferable with respect to said memory.

8. The invention as set forth in claim 6, wherein said memory control means includes a counter, a source of clock pulses, and logic means for applying said clock pulses to said counter and enabling said counter to count said clock pulses in response to said commands applied via said priority control means.

9. The invention set forth in claim 6 wherein said memory has storage for four blocks of data, each block corresponding to a different one of said sections, and means included in said memory control means for transferring data between different ones of said sections and the block in said memory corresponding thereto.

10. The invention as set forth in claim 9 wherein said blocks are an input block (hereinafter called IBS) corresponding to said input section, an output block (hereinafter called OBS) corresponding to said output section, a transmitter block (hereinafter called TBS) corresponding to said transmitter section and a receiver block (hereinafter called RBS) corresponding to said receiver section, said data transferring means including (a) means coupled to said input section for transferring successive messages from said input device first into one of said IBS and TBS and then into the other thereof, (b) means coupled to said transmitter section for transferring to said channel said messages stored in said IBS and TBS first from said one of said IBS and TBS and then from the other thereof, (c) means coupled to said receiver section for transferring messages from said channel first into one of said RBS and OBS and next into the other thereof, and (d) means coupled to said output channel for transferring to said output device first the message stored in said one of said RBS and OBS and then the message stored in the other thereof.

References Cited

UNITED STATES PATENTS

| | | | |
|---|---|---|---|
| 3,202,972 | 8/1965 | Stafford et al. | 340—172.5 |
| 3,275,994 | 9/1966 | Joseph | 340—172.5 |
| 3,283,306 | 11/1966 | Patrusky | 340—172.5 |

JOHN P. VANDENBURG, Primary Examiner